Jan. 13, 1931.  W. NOBLE  1,789,190
INTERNAL COMBUSTION ENGINE
Filed July 16, 1928
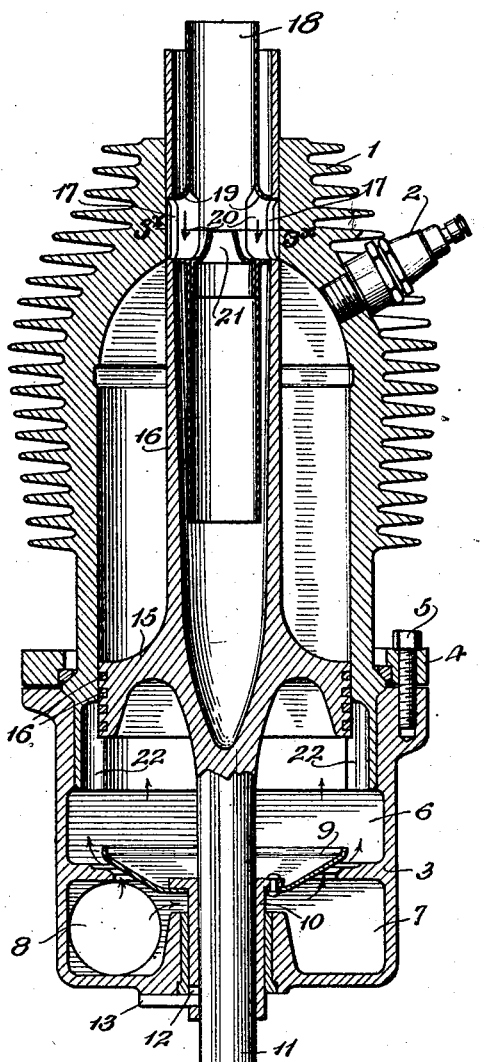
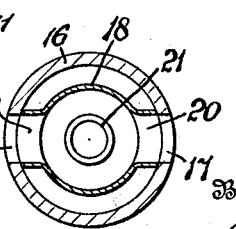
Inventor
Warren Noble.
By
Stanley Lightfoot
Attorney Patented Jan. 13, 1931

1,789,190

UNITED STATES PATENT OFFICE

WARREN NOBLE, OF DETROIT, MICHIGAN

INTERNAL-COMBUSTION ENGINE

Application filed July 16, 1928. Serial No. 293,151.

This invention relates to internal combustion engines, more particularly of the two cycle type and has as an object to provide an arrangement suitable for a high speed engine for use in aircraft and adaptable to automobiles or other vehicles.

It is a still further object to provide such an engine design which will yield great thermal and volumetric efficiency.

It is a further object of the invention to provide such as assembly which will permit of effective cooling of the exhaust ports and valves.

A further object is to provide a rear compression fuel chamber and an inlet valve therefor operated automatically by the piston rod so that separate valve operating mechanism may be dispensed with.

A still further object is to provide a cylinder and piston construction which will be of light weight, easy and comparatively cheap to manufacture and yet possessing inherent qualities which guarantee long life.

The invention further contemplates the utilizing of exhaust gas flow to induce a cooling air flow to the piston and to certain parts associated with the exhaust gas disposal means; and to provide a cylinder and piston assembly which will admit of the use of aluminum of similar comparatively soft metal in the cylinder with a minimum of wear in use.

Numerous types and designs of two cycle engines have been proposed but it may generally be stated that none have met with much commercial success which have attempted to provide light weight and high speed. Failures may be attributed to four main reasons,—namely, (1) irregular feeding of fuel to the cylinders, (2) overheating, (3) either loss of fuel or loss of volumetric efficiency, (4) burning up of exhaust ports, and (5) wear of relatively movable parts. In the conventional type of two cycle engine, the inlet valve to a compression chamber had generally depended for operation on suction created by the upward stroke of the piston. A valve spring is, of course, employed to yieldingly seat the valve. It has been found that suction behind a piston does not vary definitely, evenly and smoothly according to either speed or load and hence in a variable speed engine having a plurality of cylinders, the delivery of fuel to a cylinder and hence the delivery of power to the crankshaft is not even and smooth. Such differential and varying deliveries of power very naturally impose undue strains on the crankshaft and the entire engine generally, so that unreliability and short life are the result. This condition is attributable directly to the means by which the valve is open and I therefore provide frictional means for cooperation with the suction behind the piston for requiring that the inlet valve to the compression chamber open positively and definitely. The same means are employed to close the valve.

The second point, overheating, is due to the restricted time allowed the piston for disposing of the heat it absorbs from each explosion. In all conventional type engines, a piston must depend on the piston rings for disposal of approximately 90 per cent of its heat therethru to the cylinder walls. If the capacity of the rings is insufficient overheating with contingent warping, pre-ignition of fuel and other detrimental conditions occur. I overcome such danger by introducing air directly from the atmosphere and imparting velocity to it for impinging directly against my piston. I further provide a metallic path from the head of the piston to the atmosphere at all times.

The third condition, maintaining high volumetric and thermal efficiency, I provide for by employing a dome shaped combustion chamber having an exhaust valve disposed centrally therein. Such a shape is admitted by all skilled in the art to be productive of maximum fuel turbulence and hence maximum benefits from fuel, commonly called thermal efficiency. The aforementioned upstanding piston portion projects thru and forms an exhaust passage. This portion therefore restricts the available space in the dome forming a rather small pocket at the area around the ports. Thus when fresh fuel is admitted, driving out exhaust gases, all the gases must pass thru that particular little pocket. It is a bottle-neck effect which prevents fresh fuel from being lost because all exhaust gases are compelled to first be driven out before fresh fuel reaches the neck. It is, therefore, only a matter of timing the closing of my exhaust valve by properly computing the length of time of valve opening to require high volumetric efficiency.

The fourth condition, burning exhaust valves, is very effectively cared for by using a slide valve which slides completely outwardly of the cylinder and is exposed to the air at each stroke of the piston.

Further objects and advantages either directly implied or incidental to the arrangement of parts shown will become apparent as reference is had to the accompanying drawings wherein is illustrated, by way of example, one embodiment of my invention and in which Figure 1 shows a vertical section thru the axis of any improved piston and cylinder assembly at the end of the power stroke;

Figure 2 shows a view similar to Figure 1, showing the piston after it has initiated its compression stroke; and Figure 3 is a transverse section through the tubular extension of the piston taken on the line 3ˣ—3ˣ, Figure 2.

Referring more particularly to the drawings:

1 indicates a cylinder of a two cycle engine having a spark plug 2 and secured to a housing 3 by a ring 4 and bolts 5. Housing 3 is comprised of two parts, an upper part 6 which is a fuel compression chamber and a lower chamber 7 having a fuel inlet port 8, the two chambers being separated by a valve 9. Valve 9 seats on the base of chamber 6 to open therein and is fitted with a collar 10 in sliding engagement with a piston rod 11 and having a slot 12 for engagement by a lug or stop 13 which limits the outward movement of valve 9 to the length of the slot. The collar 10 forms a rather snug fit with rod 11 so that upon outward movement of the rod friction between these parts will open valve 9 positively and promptly and in like manner will close the valve as rod 11 begins its inward travel.

Piston rod 11 extends thruout cylinder 1 projecting thru a port 14 in the head thereof and carries an integrally built piston 15 equipped with conventional rings 16. From any desired point, but preferably from a point substantially below the lowermost piston ring 16 and from thence outwardly the piston rod 11 is hollow and preferably cylindrical in shape, snugly fitting the walls of the port 14 in order to retain compression in the cylinder. Of course, I may employ compression rings seating in the wall of port 14 if desired. The piston 15 is thus guided from both sides at all times.

The outer portion of piston rod 11 which is generally designated as 16 is hollow, as stated, the lower inside portion being generally tapered but not defining a point, the outer end opening to the atmosphere so that air may enter for cooling purposes as will be explained.

Ports 17 are provided in the walls of the extension 16. These are exhaust ports and are so positioned as to be entirely open to the combustion chamber when the piston has reached its innermost position and of such size as to permit exit of all exhaust gases in the allotted amount of time for the piston to reverse its direction and start upwardly on its return stroke.

Within the extension 16 is a tube 18 of reduced diameter but flared at 19 to provide passages 20 communicating with and entirely overlying ports 17. The tube 18 extends well down into extension 16, as shown. A nozzle 21, secured to tube 18 so that its throat will extend outwardly from the innermost part of ports 17 is provided in order to direct the exhaust gases outwardly.

Air may enter between the walls of the tube 18 and extension 16, and the passage of exhaust gases past nozzle 21 creates a reduction in pressure therein so that air in the innermost part of extension 16 is drawn outwardly thru the nozzle, inducing cooling air into the outer end of the space between the walls of said tube 18 and extension 16.

A study of Figures 1 and 2 reveals the means by which the length of ports 17 may be computed. Suppose that in Figure 2 the piston is finishing its power stroke. Ports 17 are just ready to be exposed while inlet passages 22, of which there may be any desired number as for instance, twelve, are still well covered. Further inward movement of the piston opens the said exhaust ports and permits immediate drop in pressure within the cylinder. Then, upon uncovering of the inlet ports, fuel compressed in chamber 6 will enter the cylinder 1 through the said inlet ports driving the exhaust gases upwardly and scavenging the cylinder. Restriction of the outer end of the cylinder by providing a hemispherical shape materially reduces tendency of the exhaust gases to mingle with the new fuel but I do not necessarily limit myself to such shape.

As the piston passes the position shown in Figure 1, closing the inlet passages 22, and the exhaust ports 17 again reach the position shown in Figure 2, the compression stroke is under way and behind piston 2 there is created a reduction in pressure which permits the opening valve 9 under the frictional influence on the sleeve 10 whereupon a new fuel mixture is drawn into compression chamber 6.

While I have particularly described one specific embodiment of my invention, it is obvious that numerous changes of details may be made without departing from the spirit of my invention and I therefore desire to be limited in construction and application thereof only by the scope of the appended claims, wherein,

I claim:—

1. In combination, a cylinder, a piston in said cylinder, and means directing a continuous flow of air thru the head of said cylinder on to the head of said piston.

2. In combination, a cylinder a piston in said cylinder, a hollow extension on the head of said cylinder and means for inducing a flow of air into and out of said extension whereby the piston head is cooled.

3. In combination, a cylinder and a piston in said cylinder, and a hollow extension on the head of said piston projecting thru the head of said cylinder, said hollow portion comprising an exhaust gas passage for said cylinder.

4. In combination, a cylinder, a piston in said cylinder, a hollow extension on the head of said piston projecting continuously thru the head of said cylinder, said extension comprising an exhaust gas passage and an air passage in the outer portion thereof and an air passage in the inner portion thereof.

5. In combination, a cylinder, a piston in said cylinder, an extension on said piston, said extension having a hollow portion therein extending substantially below the head of said piston, a tubular member in said hollow portion spaced from the walls thereof and extending outwardly of said extension whereby air may enter outwardly of said tube and be returned thru said tube, and means for inducing flow of air therethru.

6. In combination, a cylinder, a piston in said cylinder, a hollow upstanding portion on the head of said cylinder extending thru the head of said cylinder, a tubuluar member within said hollow portion in spaced relation thereto and extending substantially outwardly of said portion and terminating substantially above the bottom of the hollowed out portion, passageways from said tube extending outwardly of said portion, said passageways being wholly uncovered to the interior of the cylinder when the piston reaches its innermost position, a restricted neck portion in said tubular member extending into said passageways whereby exhaust gases are directed outwardly of said tubular member and whereby a drop in pressure at the neck portion induces flow of air into said hollowed out portion outwardly thereof and out the neck of said tubular member.

In testimony whereof I affix my signature.

WARREN NOBLE.